(12) United States Patent
Attar et al.

(10) Patent No.: US 10,382,345 B2
(45) Date of Patent: Aug. 13, 2019

(54) DYNAMIC FLOWLET PRIORITIZATION

(71) Applicant: Cisco Technology, Inc., San Jose, CA (US)

(72) Inventors: Mohammadreza Alizadeh Attar, Santa Clara, CA (US); Thomas James Edsall, Los Gatos, CA (US); Sarang Dharmapurikar, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/682,339

(22) Filed: Aug. 21, 2017

(65) Prior Publication Data

US 2017/0346748 A1 Nov. 30, 2017

Related U.S. Application Data

(63) Continuation of application No. 14/099,638, filed on Dec. 6, 2013, now Pat. No. 9,769,078.

(60) Provisional application No. 61/900,277, filed on Nov. 5, 2013.

(51) Int. Cl.
   *H04L 12/833* (2013.01)
   *H04L 12/841* (2013.01)

(52) U.S. Cl.
   CPC ........ *H04L 47/2458* (2013.01); *H04L 47/283* (2013.01)

(58) Field of Classification Search
   None
   See application file for complete search history.

(56) References Cited

U.S. PATENT DOCUMENTS

| | | | |
|---|---|---|---|
| 4,298,770 | A | 11/1981 | Nishihara et al. |
| 4,636,919 | A | 1/1987 | Itakura et al. |
| 4,700,016 | A | 10/1987 | Hitchcock et al. |
| 5,115,431 | A | 5/1992 | Williams et al. |
| 5,859,835 | A | 1/1999 | Varma et al. |
| 5,926,458 | A | 7/1999 | Yin et al. |
| 6,252,876 | B1 | 6/2001 | Brueckheimer et al. |

(Continued)

FOREIGN PATENT DOCUMENTS

| | | |
|---|---|---|
| WO | WO 2003/067799 | 8/2003 |
| WO | WO 2014/071996 | 5/2014 |

OTHER PUBLICATIONS

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

(Continued)

*Primary Examiner* — Diane L Lo
(74) *Attorney, Agent, or Firm* — Polsinelli PC

(57) ABSTRACT

In one embodiment, a next set of packets in a first flow may be identified. A counter may be incremented, where the counter indicates a first number of initial sets of packets in first flow that have been identified. The identified next set of packets may be prioritized such that the first number of initial sets of packets in the first flow are prioritized and a sequential order of all packets in the first flow is maintained. The identifying, incrementing, and prioritizing may be repeated until no further sets of packets in the first flow remain to be identified or the first number of initial sets of packets is equal to a first predefined number.

20 Claims, 8 Drawing Sheets

(56) References Cited

U.S. PATENT DOCUMENTS

| | | |
|---|---|---|
| 6,389,031 B1 | 5/2002 | Chao |
| 6,456,624 B1 | 9/2002 | Eccles et al. |
| 6,650,640 B1 | 11/2003 | Muller et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,876,952 B1 | 4/2005 | Kappler et al. |
| 6,907,039 B2 | 6/2005 | Shen |
| 6,941,649 B2 | 9/2005 | Goergen |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,372,857 B1 | 5/2008 | Kappler et al. |
| 7,411,915 B1 | 8/2008 | Spain et al. |
| 7,426,604 B1 | 9/2008 | Rygh et al. |
| 7,516,211 B1 | 4/2009 | Gourlay et al. |
| 7,539,131 B2 | 5/2009 | Shen |
| 7,580,409 B1 | 8/2009 | Swenson et al. |
| 7,630,368 B2 | 12/2009 | Tripathi et al. |
| 7,729,296 B1 | 6/2010 | Choudhary |
| 7,826,400 B2 | 11/2010 | Sakauchi |
| 7,826,469 B1 | 11/2010 | Li et al. |
| 7,848,340 B2 | 12/2010 | Sakauchi et al. |
| 8,233,384 B2 | 7/2012 | Osterhout et al. |
| 8,302,301 B2 | 11/2012 | Lau |
| 8,325,459 B2 | 12/2012 | Mutnury et al. |
| 8,339,973 B1 | 12/2012 | Pichumani et al. |
| 8,378,223 B1 | 2/2013 | Shiue et al. |
| 8,442,063 B1 | 5/2013 | Zhou et al. |
| 8,514,712 B1 | 8/2013 | Aswadhati |
| 8,687,629 B1 | 4/2014 | Kompella et al. |
| 8,854,972 B1 | 10/2014 | Li |
| 8,868,766 B1 | 10/2014 | Theimer et al. |
| 8,908,691 B2 | 12/2014 | Biswas et al. |
| 9,036,481 B1 | 5/2015 | White |
| 9,106,508 B2 | 8/2015 | Banavalikar et al. |
| 9,178,715 B2 | 11/2015 | Jain et al. |
| 9,197,551 B2 | 11/2015 | DeCusatis et al. |
| 9,203,188 B1 | 12/2015 | Siechen et al. |
| 9,245,626 B2 | 1/2016 | Fingerhut et al. |
| 9,258,195 B1 | 2/2016 | Pendleton et al. |
| 9,325,524 B2 | 4/2016 | Banavalikar et al. |
| 9,374,294 B1 | 6/2016 | Pani |
| 9,402,470 B2 | 8/2016 | Shen et al. |
| 9,407,501 B2 | 8/2016 | Yadav et al. |
| 9,426,060 B2 | 8/2016 | Dixon et al. |
| 9,433,081 B1 | 8/2016 | Xiong et al. |
| 9,444,634 B2 | 9/2016 | Pani |
| 9,502,111 B2 | 11/2016 | Dharmapurikar et al. |
| 9,509,092 B2 | 11/2016 | Shen et al. |
| 9,544,185 B1 | 1/2017 | Yadav et al. |
| 9,544,224 B2 | 1/2017 | Chu et al. |
| 9,590,914 B2 | 3/2017 | Alizadeh Attar et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,674,086 B2 | 6/2017 | Ma et al. |
| 9,686,180 B2 | 6/2017 | Chu et al. |
| 9,698,994 B2 | 7/2017 | Pani |
| 9,716,665 B2 | 7/2017 | Alizadeh Attar et al. |
| 9,742,673 B2 | 8/2017 | Banerjee et al. |
| 9,755,965 B1 | 9/2017 | Yadav et al. |
| 9,769,078 B2 | 9/2017 | Attar et al. |
| 9,876,715 B2 | 1/2018 | Edsall et al. |
| 2002/0126671 A1 | 9/2002 | Ellis et al. |
| 2002/0136268 A1 | 9/2002 | Gan et al. |
| 2002/0146026 A1 | 10/2002 | Unitt et al. |
| 2003/0035385 A1 | 2/2003 | Walsh et al. |
| 2003/0058837 A1 | 3/2003 | Denney et al. |
| 2003/0058860 A1 | 3/2003 | Kunze et al. |
| 2003/0067912 A1 | 4/2003 | Mead et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0120884 A1 | 6/2003 | Koob et al. |
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0031030 A1 | 2/2004 | Kidder et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0010685 A1 | 1/2005 | Ramnath et al. |
| 2005/0013280 A1 | 1/2005 | Buddhikot et al. |
| 2005/0073958 A1 | 4/2005 | Atlas et al. |
| 2005/0083835 A1 | 4/2005 | Prairie et al. |
| 2005/0091239 A1 | 4/2005 | Ward et al. |
| 2005/0117593 A1 | 6/2005 | Shand |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2005/0240745 A1 | 10/2005 | Iyer et al. |
| 2006/0013143 A1 | 1/2006 | Yasuie et al. |
| 2006/0028285 A1 | 2/2006 | Jang et al. |
| 2006/0031643 A1 | 2/2006 | Figueira |
| 2006/0039364 A1 | 2/2006 | Wright |
| 2006/0072461 A1 | 4/2006 | Luong et al. |
| 2006/0075093 A1 | 4/2006 | Frattura et al. |
| 2006/0083179 A1 | 4/2006 | Mitchell |
| 2006/0083256 A1 | 4/2006 | Mitchell |
| 2006/0182036 A1 | 8/2006 | Sasagawa et al. |
| 2006/0193332 A1 | 8/2006 | Qian et al. |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0221950 A1 | 10/2006 | Heer |
| 2006/0227790 A1 | 10/2006 | Yeung et al. |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274647 A1 | 12/2006 | Wang et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0047463 A1 | 3/2007 | Jarvis et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0159987 A1 | 7/2007 | Khan et al. |
| 2007/0160073 A1 | 7/2007 | Toumura et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0211625 A1 | 9/2007 | Liu et al. |
| 2007/0217415 A1 | 9/2007 | Wijnands et al. |
| 2007/0223372 A1 | 9/2007 | Haalen et al. |
| 2007/0233847 A1 | 10/2007 | Aldereguia et al. |

(56) References Cited

U.S. PATENT DOCUMENTS

| | | |
|---|---|---|
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0123559 A1 | 5/2008 | Haviv et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0212496 A1 | 9/2008 | Zou |
| 2008/0219173 A1 | 9/2008 | Yoshida et al. |
| 2008/0225853 A1 | 9/2008 | Melman et al. |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0067322 A1 | 3/2009 | Shand et al. |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0161567 A1 | 6/2009 | Jayawardena et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238196 A1 | 9/2009 | Ukita et al. |
| 2009/0268614 A1 | 10/2009 | Tay et al. |
| 2009/0271508 A1 | 10/2009 | Sommers et al. |
| 2010/0020719 A1 | 1/2010 | Chu et al. |
| 2010/0020726 A1 | 1/2010 | Chu et al. |
| 2010/0128619 A1 | 5/2010 | Shigei |
| 2010/0150155 A1 | 6/2010 | Napierala |
| 2010/0161787 A1 | 6/2010 | Jones |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2010/0312928 A1* | 12/2010 | Brownell ............ G06F 13/387 710/57 |
| 2011/0022725 A1 | 1/2011 | Farkas |
| 2011/0110241 A1 | 5/2011 | Atkinson et al. |
| 2011/0110587 A1 | 5/2011 | Banner |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0203834 A1 | 8/2011 | Yoneya et al. |
| 2011/0228795 A1 | 9/2011 | Agrawal et al. |
| 2011/0239189 A1 | 9/2011 | Attalla |
| 2011/0243136 A1 | 10/2011 | Raman et al. |
| 2011/0249682 A1 | 10/2011 | Kean et al. |
| 2011/0268118 A1 | 11/2011 | Schlansker et al. |
| 2011/0273987 A1 | 11/2011 | Schlansker et al. |
| 2011/0280572 A1 | 11/2011 | Vobbilisetty et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0030150 A1 | 2/2012 | McAuley et al. |
| 2012/0030666 A1 | 2/2012 | Laicher et al. |
| 2012/0057505 A1 | 3/2012 | Xue |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163396 A1 | 6/2012 | Cheng et al. |
| 2012/0167013 A1 | 6/2012 | Kaiser et al. |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300669 A1 | 11/2012 | Zahavi |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0064246 A1 | 3/2013 | Dharmapurikar et al. |
| 2013/0090014 A1 | 4/2013 | Champion |
| 2013/0097335 A1 | 4/2013 | Jiang et al. |
| 2013/0124708 A1 | 5/2013 | Lee et al. |
| 2013/0151681 A1 | 6/2013 | Dournov et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227108 A1 | 8/2013 | Dunbar et al. |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |
| 2014/0056298 A1 | 2/2014 | Vobbilisetty et al. |
| 2014/0064281 A1 | 3/2014 | Basso et al. |
| 2014/0068750 A1 | 3/2014 | Tjahjono et al. |
| 2014/0086097 A1 | 3/2014 | Qu et al. |
| 2014/0086253 A1 | 3/2014 | Yong et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0108489 A1 | 4/2014 | Glines et al. |
| 2014/0146817 A1 | 5/2014 | Zhang |
| 2014/0146824 A1 | 5/2014 | Angst et al. |
| 2014/0149819 A1 | 5/2014 | Lu et al. |
| 2014/0185348 A1 | 7/2014 | Vattikonda et al. |
| 2014/0185349 A1 | 7/2014 | Terzioglu et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269705 A1 | 9/2014 | DeCusatis et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0016277 A1 | 1/2015 | Smith et al. |
| 2015/0052298 A1 | 2/2015 | Brand et al. |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124611 A1 | 5/2015 | Attar et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124817 A1 | 5/2015 | Merchant et al. |
| 2015/0124821 A1 | 5/2015 | Chu et al. |
| 2015/0124823 A1 | 5/2015 | Pani et al. |

(56) References Cited

U.S. PATENT DOCUMENTS

| | | |
|---|---|---|
| 2015/0124824 A1 | 5/2015 | Edsall et al. |
| 2015/0124825 A1 | 5/2015 | Dharmapurikar et al. |
| 2015/0124833 A1 | 5/2015 | Ma et al. |
| 2015/0127797 A1 | 5/2015 | Attar et al. |
| 2015/0188771 A1 | 7/2015 | Allan et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0036697 A1 | 2/2016 | DeCusatis et al. |
| 2016/0119204 A1 | 4/2016 | Murasato et al. |
| 2016/0315811 A1 | 10/2016 | Yadav et al. |
| 2017/0085469 A1 | 3/2017 | Chu et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |

OTHER PUBLICATIONS

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf.org/html/draft-mahalingam-dutt-dcops-vxlan-06, Oct. 2013, pp. 1-24.

Moncaster, T., et al., "The Need for Congestion Exposure in the Internet", Oct. 26, 2009, Internet-Draft, pp. 1-22.

Narten, T., et al., "Problem Statement: Overlays for Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004.

U.S. Office Action dated Dec. 16, 2015 issued in U.S. Appl. No. 14/099,638.

U.S. Final Office Action dated Jun. 23, 2016 issued in U.S. Appl. No. 14/099,638.

U.S. Office Action dated Nov. 3, 2016 issued in U.S. Appl. No. 14/099,638.

U.S. Notice of Allowance dated May 19, 2017 issued in U.S. Appl. No. 14/099,638.

Author Unknown, "Subset—Wikipedia, the free encyclopedia," Dec. 25, 2014, pp. 1-3.

Whitaker et al., "Forwarding Without Loops in Icarus," IEEE OPENARCH 2002, pp. 63-75.

Zhang, Junjie, et al., "Optimizing Network Performance using Weighted Multipath Routing," Aug. 27, 2012, 7 pages.

* cited by examiner

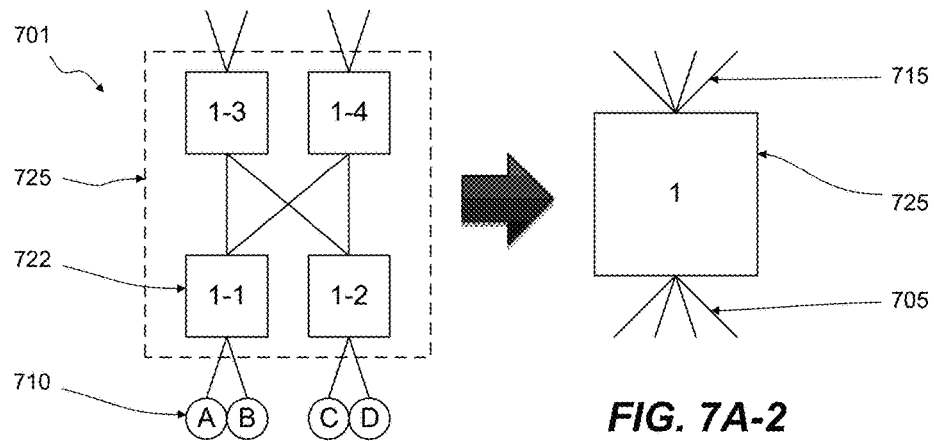
FIG. 7A-1
FIG. 7A-2
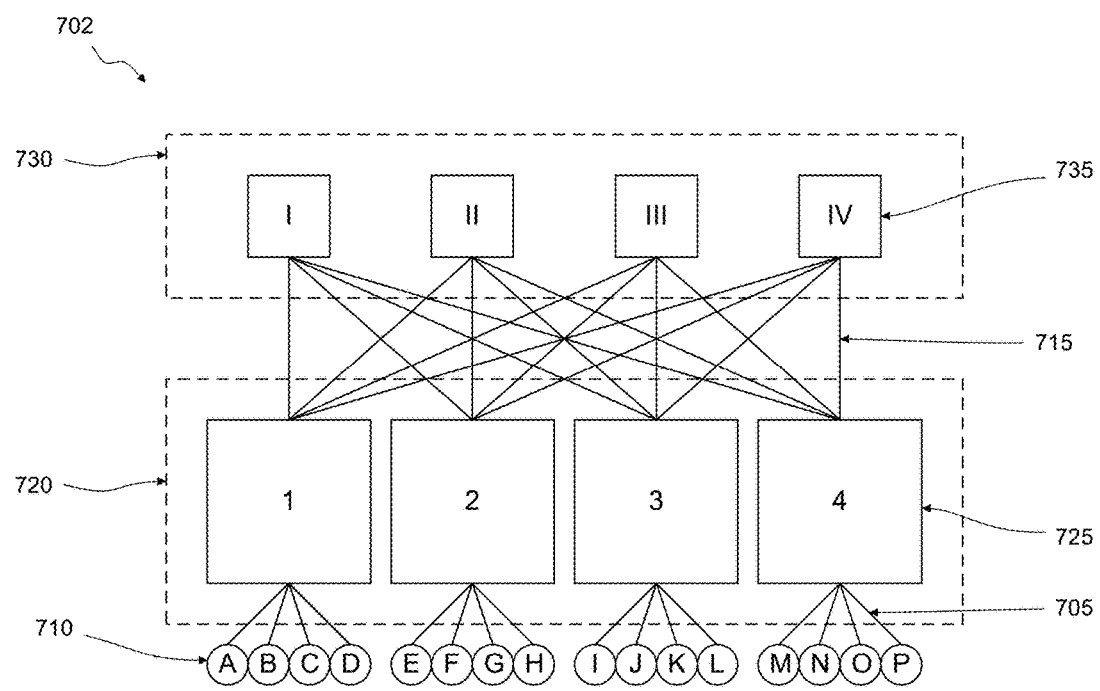
FIG. 7B

DYNAMIC FLOWLET PRIORITIZATION

RELATED APPLICATIONS

This application is a continuation of and claims priority from U.S. patent application Ser. No. 14/099,638, entitled "Dynamic Flowlet Prioritization," by Attar et al, filed on Dec. 6, 2013, which claims priority from U.S. Provisional Application No. 61/900,277, entitled "Dynamic Flowlet Prioritization," by Attar et al, filed on Nov. 5, 2013, both of which are hereby incorporated by reference in their entirety and for all purposes.

BACKGROUND

1. Technical Field

The present disclosure relates generally to the prioritization of packets in flows.

2. Description of the Related Art

In packet switching networks, the terms "traffic flow," "packet flow," "network flow," and "flow" may be used interchangeably. The term "flow" may refer to a sequence of packets sent from a source device to a destination, which may be a destination device, a multicast group, or a broadcast domain. RFC 3697, "IPv6 Flow Label Specification," J. Rajahalme, A. Conta, B. Carpenter, and S. Deering, March 2004, defines a flow as "a sequence of packets sent from a particular source to a particular unicast, anycast, or multicast destination that the source desires to label as a flow. A flow could consist of all packets in a specific transport connection or a media stream. However, a flow is not necessarily 1:1 mapped to a transport connection."

RFC 3917, "Requirements for IP Flow Information Export (IPFIX)," J. Quittek, T. Zseby, B. Claise, and S. Zander, October 2004, provides that "[a]ll packets belonging to a particular flow have a set of common properties." Often, such properties are defined by the value of one or more packet header fields, such as a source IP address field, destination IP address field, transport header field (e.g., source port number and/or destination port number), or application header field (e.g., Real-time Transport Protocol (RTP) header fields). The properties of a flow may also include one or more characteristics of the packet itself (e.g., number of MPLS labels) and/or values of one or more fields derived from packet treatment (e.g., next hop IP address, output interface, etc.) A packet is identified as belonging to a flow if it completely satisfies all the defined properties of the flow.

Today, data center fabrics handle a mix of short flows and long flows. Short flows are typically latency-sensitive, while long flows are typically bandwidth-intensive. A key challenge in today's data center fabrics is that congestion caused by long flows severely degrades the performance for short flows.

BRIEF DESCRIPTION OF THE DRAWINGS

FIGS. 7A-1, 7A-2, and 7B together illustrate an example 3-tier leaf-spine network in which various embodiments may be implemented.

DESCRIPTION OF EXAMPLE EMBODIMENTS

Figure 1:
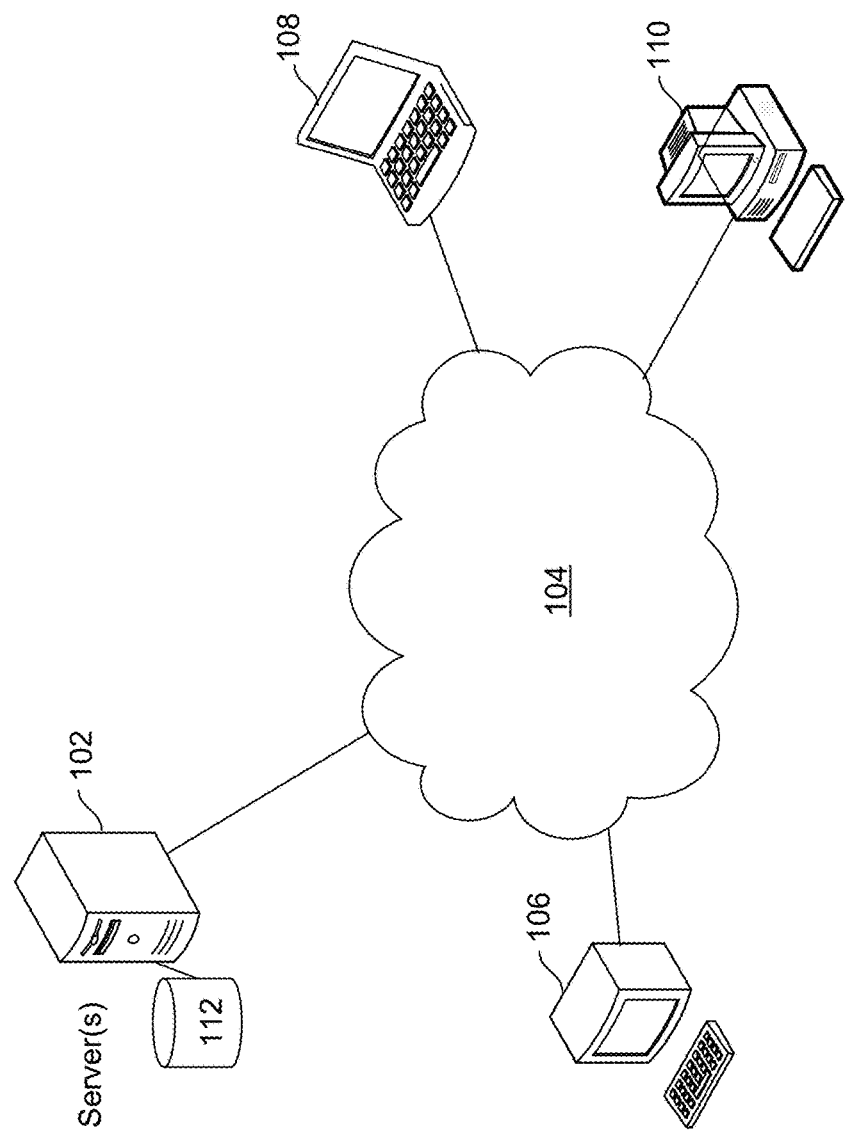
FIG. 1 is a simplified network diagram illustrating an example system in which various embodiments may be implemented.

In the following description, numerous specific details are set forth in order to provide a thorough understanding of the disclosed embodiments. It will be apparent, however, to one skilled in the art, that the disclosed embodiments may be practiced without some or all of these specific details. In other instances, well-known process steps have not been described in detail in order to simplify the description.

Overview

In one embodiment, a next set of packets in a first flow may be identified. A counter may be incremented, where the counter indicates a first number of initial sets of packets in the first flow that have been identified. The identified next set of packets may be prioritized such that the first number of initial sets of packets in the first flow are prioritized and a sequential order of all packets in the first flow is maintained. The identifying, incrementing, and prioritizing may be repeated until no further sets of packets in the first flow remain to be identified or the first number of initial sets of packets is equal to a first predefined number.

Specific Example Embodiments

The performance degradation experienced by short flows can be illustrated with reference to Transmission Control Protocol (TCP) flows. By design, long TCP flows consume all the available buffer space at their bottleneck link. As a result, a short flow that shares a bottleneck link with a long flow can experience a significant queuing delay as its packets wait behind the packets of the long flow. Even worse, there may not be buffer space left for the short flow's packets, causing them to be dropped at the bottleneck. Packet drops typically cause a short flow to take a TCP timeout which, by default, increases its completion time by approximately 200-300 ms.

Data centers are used as an infrastructure for many online services such as online stores, social networking or web search. Many short flows in data centers can ideally complete within 1 ms. As a result, a TCP timeout increasing the completion time of a short flow by 200-300 ms can be extremely costly for these flows, resulting in an increase in completion time by 1-2 orders of magnitude Therefore, for users accessing online services provided by data centers, even a small fraction of a second may be noticeable and negatively impact the user experience.

There is an even more significant delay if a TCP Synchronize (SYN) or SYN Acknowledgement (SYN ACK) packet is dropped (during the initiation of a TCP connection). The retransmission time for a SYN or SYN ACK is approximately 3 seconds in current TCP implementations. Hence, dropping a SYN or SYN ACK is so costly that it can severely impact even most long flows, as well as short flows.

There have been a number of proposals for enhancing congestion control in data centers to mitigate the performance penalties of long flows on short flows. For example, one class of data center protocols divides the link bandwidth equally among flows. However, the result has been far from optimal in terms of minimizing the average flow completion time (AFCT).

It is advantageous to minimize the AFCT of two or more flows being processed. For example, a network device such as a router or switch may receive packets associated with two flows. More particularly, a first flow may be a long flow that takes ten seconds to complete, while a second flow may be a short flow that takes one second to complete assuming it does not encounter a bottleneck. If the network device were to process the long flow first, the completion times would be 10 seconds for the long flow and 11 seconds for the short flow, resulting in an AFCT of 10.5 seconds. However, if the network device were to process the short flow first, the completion times would be 1 second for the short flow and 11 seconds for the long flow, resulting in an AFCT of 6 seconds.

As indicated by the example set forth above, if the short flows were to be processed before long flows, this would improve the completion time for the short flows drastically while only minimally impacting the completion time for long flows. As a result, one way to improve the AFCT is to prioritize short flows over long flows. However, it is often difficult or impossible to determine whether a flow will be long or short. For example, at the beginning of a voice over Internet Protocol (IP) call, it would be impossible to determine whether the call will be long or short. Another problem with shortest job first scheduling is the potential for long flows to suffer from starvation if there is always a shorter flow to be processed. Therefore, the issue of minimizing the AFCT is a difficult problem to solve.

In accordance with various embodiments, a pre-defined number of initial sets of packets of a flow are prioritized. As a result, the length of the flow is irrelevant and need not be determined to apply the disclosed embodiments. Furthermore, through the application of the disclosed embodiments, it is possible to prioritize the beginning of long flows, as well as short flows.

FIG. 1 is a simplified network diagram illustrating an example system in which various embodiments may be implemented. As shown in FIG. 1, the system may include one or more servers 102, which may be associated with a web site such as a social networking web site, an online store web site, a financial transactions site, or a company web site. The server(s) 102 may enable the web site to provide a variety of online services such as searching, social networking or web search to its users. For example, users of the web site may access user accounts, user profiles, interact with other members of the web site, upload files (e.g., photographs, videos), purchase goods or services, access information posted on the web site, perform web searches, etc.

In this example, the server(s) 102 may receive messages such as request messages via a network 104 from one or more computers 106, 108, 110. The server(s) 102 may have access to one or more data stores 112, which may include one or more memories. The server(s) may respond to the requests by accessing the data stores 112 as appropriate, and sending response messages via the network 104 to the corresponding computers 106, 108, 110.

Messages that are sent via the network 104 are composed of packets. Each packet may be associated with a particular flow, which is uniquely defined by a set of common properties, which may include the value of one or more packet header fields. For example, each flow may be uniquely identified by a source Internet Protocol (IP) address, a destination IP address, a source port, and/or a destination port. These flows may be propagated through the network 104 via network devices such as routers and/or switches.

Within the network 104, a network device such as a router or switch may receive a first flow of packets from a first source device addressed to a first destination. For example, the first flow of packets may be sent from the computer 106 to the server(s) 102. However, the network device may also receive a second flow of packets from a second source device addressed to the first destination. For example, the second flow of packets may be sent from the computer 108 to the server(s) 102. Unfortunately, the network device may not have the resources to simultaneously process (e.g., forward) packets in the first flow and packets in the second flow. As a result, the network device may apply a prioritization mechanism to each flow in order to optimize the user experience, as well as ensure some level of fairness within the system. The prioritization mechanism may be performed entirely at the network device and may be advantageously performed without explicit congestion signaling. Various embodiments for prioritizing packets will be described in further detail below.

Figure 2:
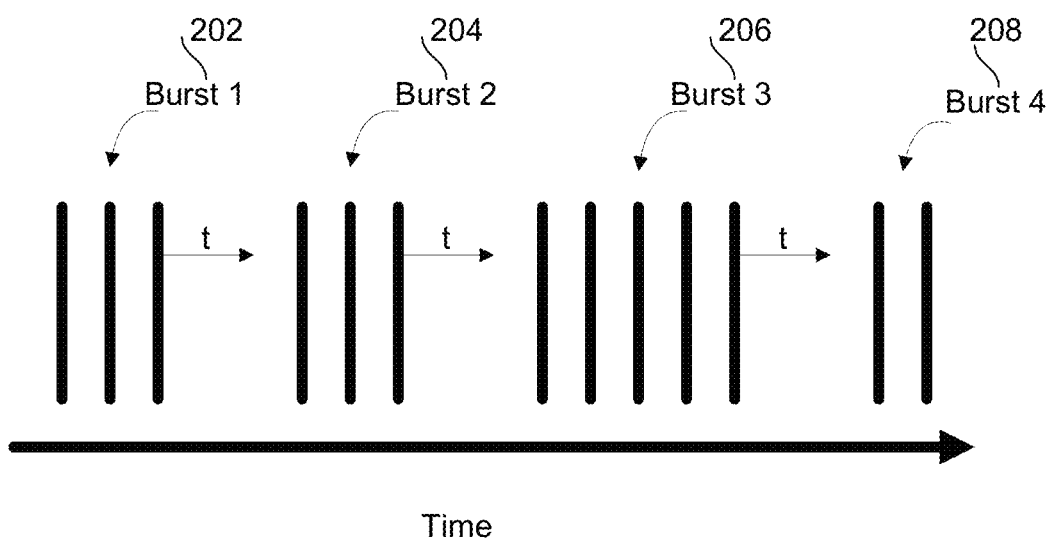
FIG. 2 is a diagram illustrating example packet flow that may be processed in accordance with various embodiments.

FIG. 2 is a diagram illustrating an example packet flow that may be processed in accordance with various embodiments. In this example, each vertical line represents a separate packet. The flow illustrated in FIG. 2 includes 13 packets that are received at various points in time. Because packets may be created and/or forwarded at inconsistent rates by various network devices, there may be a delay between the receipt of one packet in the flow and the receipt of the next packet in the flow, as shown in this example. Commonly, packets of a flow are transmitted and received in "bursts," i.e., groups of closely spaced and contiguously issued packets.

In accordance with various embodiments, packets may be prioritized on a per-packet basis or as groups of packets, which may be referred to as "flowlets." In some implementations, flowlets may correspond to bursts of packets. The existence of a time delay between the receipt of one packet and the receipt of a subsequent packet that is greater than or equal to a pre-defined time, t, may be used to delineate one burst of packets from another burst of packets. The time delay may be ascertained by comparing a time stamp from one packet with the time stamp from a subsequently received packet. In this example, four different bursts of packets are illustrated, where the four different bursts of packets are separated by a time delay that is greater than or equal to the pre-defined time, t. As shown in FIG. 2, the first burst, Burst 1 202, includes three packets, the second burst, Burst 2 204, includes three packets, the third burst, Burst 3 206, includes 5 packets, and the fourth burst, Burst 4 208, includes 2 packets. As shown in FIG. 2, the number of packets in different bursts of packets may vary from one another.

A network device such as a switch or router may process at least a portion of packets of a flow as they are obtained.

More particularly, at least a portion of the packets of the flow may be processed dynamically in real-time as they are received. The network device may also periodically obtain at least a portion of the packets of the flow from a queue so that they may be processed. An example network device will be described in further detail below with reference to FIG. 8. In the following description, methods and apparatus for prioritizing sets of packets within flows will be described. More particularly, a pre-defined number of initial sets of packets may be prioritized. Each set of packets may include one or more packets.

In some embodiments, a network device or group of devices may divide a flow into two or more sets of packets having corresponding priorities (e.g., for network transmission). Each set of packets may include only those packets in a flowlet (e.g., burst of packets). Each flowlet may include one or more packets.

In other embodiments, each set of packets may be a single packet. Thus, a pre-defined number of initial packets in a flow may be prioritized.

As will be described in further detail below, a pre-defined number of initial sets of packets from each flow may be prioritized. If a flow has less than the pre-defined number of sets of packets, then all sets of packets for that flow may be prioritized. However, if the flow has more than the pre-defined number of packets, then only the first pre-defined number of sets of packets may be prioritized. A method of prioritizing a pre-defined number of sets of packets from flows will be described below with reference to FIG. 3, while a method of prioritizing each individual set of packets in the pre-defined number of sets of packets will be described below with reference to FIGS. 4A-4B.

Figure 3:
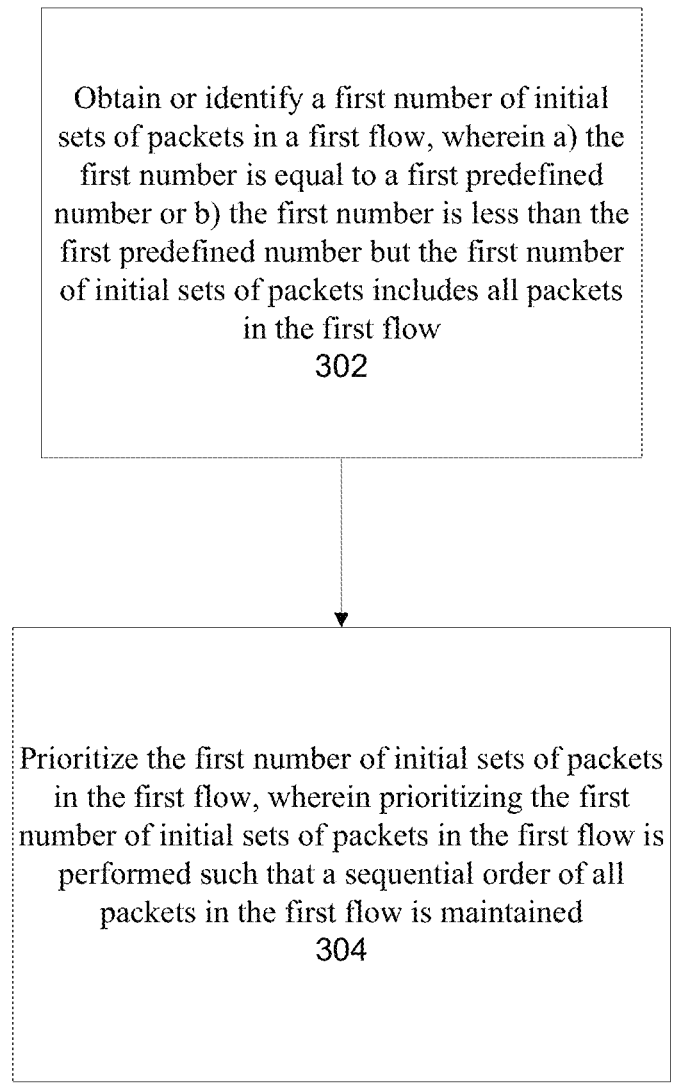
FIG. 3 is a process flow diagram illustrating an example method of prioritizing a pre-defined number of sets of packets for a particular flow in accordance with various embodiments.

FIG. 3 is a process flow diagram illustrating an example method of prioritizing a pre-defined number of sets of packets for a particular flow in accordance with various embodiments. A first number of initial sets of packets in a first flow may be obtained or identified at 302. In some embodiments, sets of packets may be examined to identify packets having particular characteristics so that they may be classified as having a corresponding priority. In other embodiments, sets of packets need not be examined, since a priority is assigned regardless of characteristics of the packets.

For example, a count indicating the number of sets of packets in the first flow may be initialized to zero and incremented to count the number of sets of packets in the flow. Those packets corresponding to a count that is less than or equal to a first predefined number may be prioritized over those packets having a count that is greater than the first predefined number, as will be described in further detail below. Thus, where the total number of sets of packets in the first flow is greater than or equal to the first pre-defined number, the first pre-defined number of initial sets of packets will be treated with a high priority. Stated another way, the first number of packets that are prioritized will be equal to the first pre-defined number. However, where the total number of sets of packets in the first flow is less than the first pre-defined number, all sets of packets in the first flow will be treated with a high priority. In other words, the first number of packets that are prioritized will be equal to the number of sets of packets in the first flow.

Various implementations disclosed herein employ a technique for distinguishing one set from the next in a packet flow. Each set so identified is counted and when a threshold number of initial sets in a flow is reached, the process may apply a lower priority to later received packets.

In some embodiments, each set of packets in the first number of initial sets of packets in the first flow may be a burst of packets. A set of packets may be identified by the presence of at least a pre-defined time delay that separates the time of receipt of a set of packets (e.g., the time of receipt of the last packet in the set of packets) from the time of receipt of a subsequent set of packets (e.g., the time of receipt of the first packet in the subsequent set of packets). In other words, the presence of less than the pre-defined time delay between two packets results in the two packets being in the same set of packets. As a result, the identification of a particular packet as being within a particular set of packets may be determined according to the time that the packet has been received. Accordingly, the first number of initial sets of packets in the first flow may be separated from one another by at least a predefined period of time.

In alternative embodiments, the process does not attempt to group packets into sets. Rather it simply counts the packets in a new flow. When a threshold number of packets in the flow is received, the process applies the lower priority to later received packets. In this alternate approach, each packet is in some sense a "set," even though no attempt is made to group successive packets. Accordingly, each set of packets in the first number of initial sets of packets in the first flow may contain only a single packet.

The first number of initial sets of packets in the first flow may be prioritized at 304 without prioritizing the remaining packets in the first flow. Such prioritization may include dynamically prioritizing each individual set of packets of the first number of initial sets immediately in real-time as the packets are received or obtained (e.g., from a queue). The processing of individual sets of packets will be described in further detail below with reference to FIGS. 4A-4B.

The prioritization of packets in the first number of initial sets of packets in the first flow may be performed such that a sequential order of all packets in the first flow is maintained. For example, the packets in the first flow may be delivered to their destination in the sequential order. More particularly, the prioritization of the first number of initial sets of packets in the first flow may be performed such that the first number of initial sets of packets are processed (e.g., forwarded) prior to packets associated with one or more other flow(s). This may be accomplished by assigning a high priority to the first number of initial sets of packets (e.g., those packets having a count that is less than or equal to the first predefined number). For example, the first number of initial sets of packets may be added to a high priority queue. Any remaining sets of packets in the first flow may be processed, as usual or more slowly than normal. In some embodiments, any remaining sets of packets in the first flow may be assigned a lower priority. For example, the remaining sets of packets may be added to a lower priority queue, which may be a medium or low priority queue. While the assignment of a priority to "sets" of packets is described herein, it follows that the packets within the corresponding sets are assigned the same priority.

The prioritization of the first number of initial sets of packets in the first flow may be performed independent of content of a payload of packets in the first number of initial sets of packets in the first flow. Furthermore, such prioritization of the first number of initial sets of packets may be performed without marking packets in the first number of initial sets of packets. For example, packets need not be marked to indicate a corresponding prioritization or length of the flow.

Figure 4A:
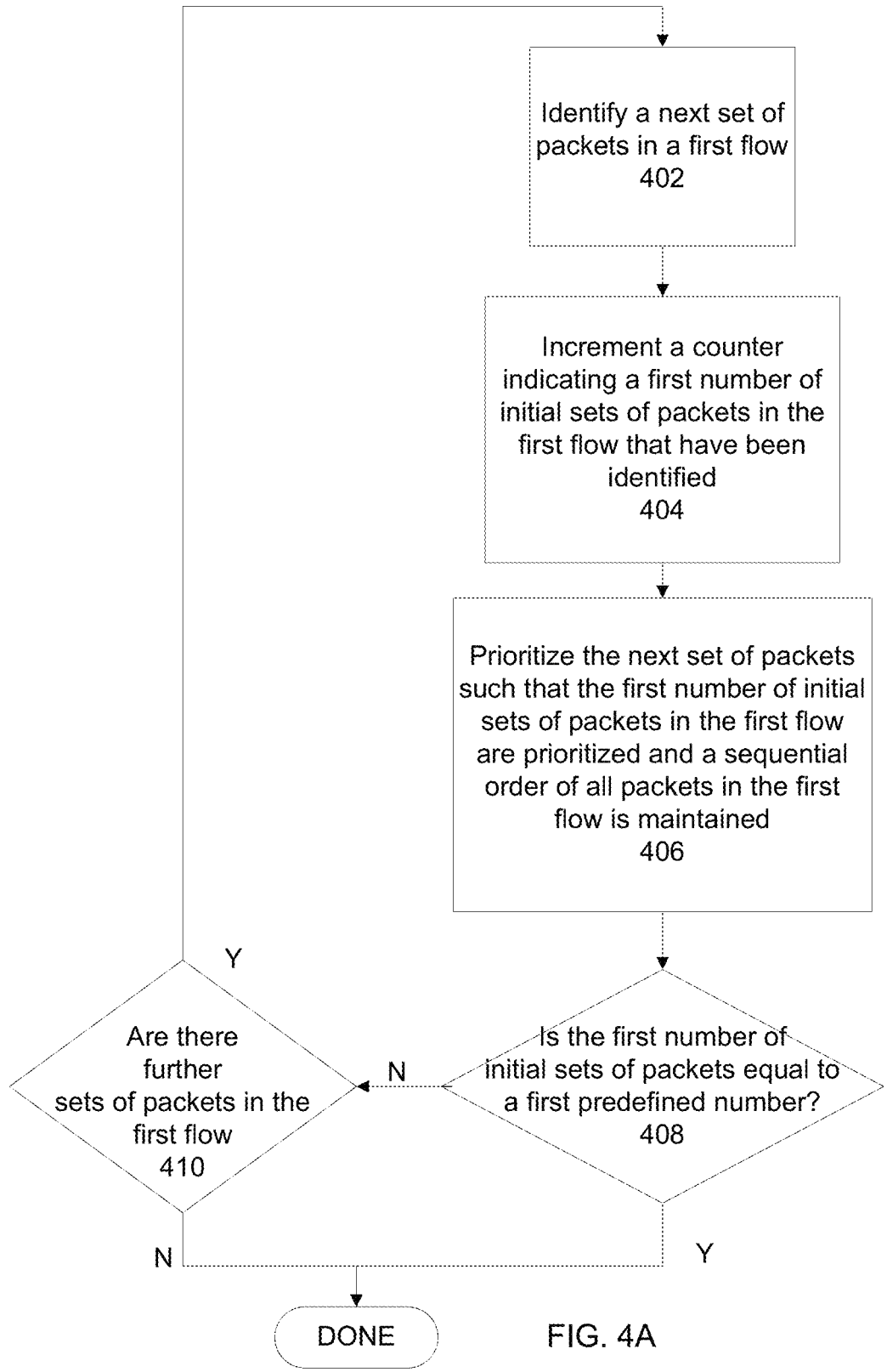
FIGS. 4A and B are process flow diagrams illustrating example methods of prioritizing individual sets of packets for a particular flow in accordance with various embodiments.

Although not shown in FIG. 3, the prioritization process may be a dynamic process that is performed as packets are received or obtained (e.g., from a queue). FIG. 4A is a process flow diagram illustrating an example method of prioritizing individual sets of packets for a particular flow in accordance with various embodiments. A counter indicating the number of sets of packets that have been prioritized may be initialized to zero prior to processing packets for a new flow. As shown in FIG. 4, a next set of packets in a first flow may be identified at 402. More particularly, a set of packets may be initialized (e.g., to a null set). A next packet in the first flow may be obtained such that the set of packets includes the next packet. A lapse of time until receipt of a subsequent packet may then be measured. More particularly, the lapse of time may be ascertained by comparing a time stamp from the next packet with the time stamp of the subsequent packet in the first plurality of packets that is obtained. The obtaining and measuring may be repeated until the lapse of time is at least a predefined period of time, indicating that a new set of packets is being received.

A counter indicating a first number of initial sets of packets in the first flow that have been identified may be incremented at 404. The identified next set of packets may be prioritized at 406 such that the first number of initial sets of packets in the first flow are prioritized and a sequential order of all packets in the first flow is maintained. For example, the packets in the first flow may be delivered to the destination in the sequential order. More particularly, this may be accomplished by assigning a high priority to the identified set of packets. For example, the identified set of packets may be added to a high priority queue. The identifying, incrementing, and prioritizing may be repeated as shown until the first number of initial sets of packets is equal to a first predefined number 408 or no further sets of packets in the first flow remain to be identified 410. Any remaining packets in the first flow may be assigned a lower priority (e.g., by adding the remaining packets to a medium or low priority queue), as will be described in further detail below with reference to FIG. 4B.

Figure 4B:
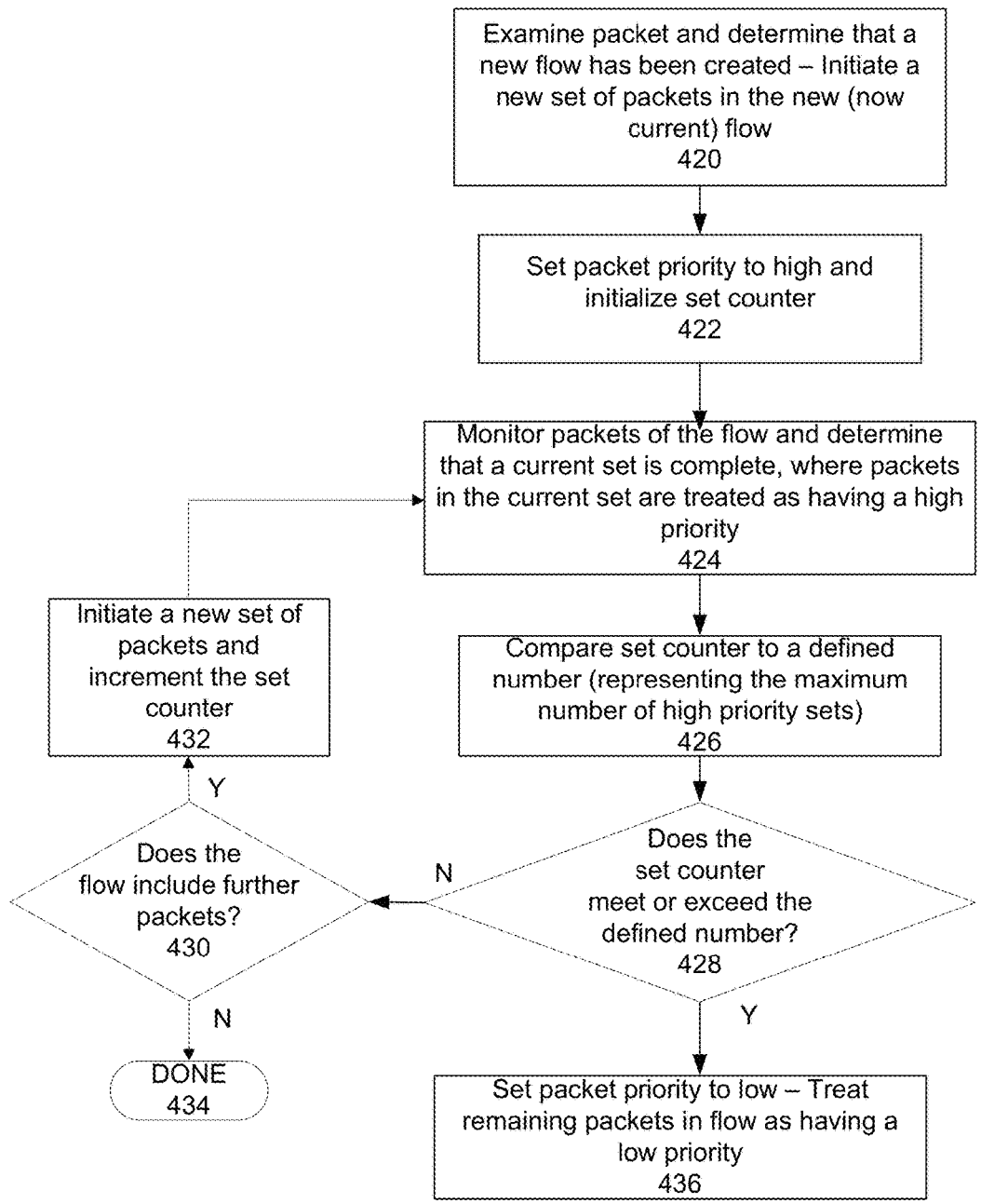

As shown in FIG. 4B, a network device may examine a packet and determine that a new flow has been created at 420. For example, the network device may determine that a new flow has been created based upon information in a header of the packet. A new set of packets in the new (now current) flow may be initiated by adding the packet to the new set of packets. A packet priority may be set to high and a set counter may be initialized at 422. The network device may monitor packets of the flow until it determines that a current set is complete at 424, where packets in the current set are treated as having a high priority.

The set counter may be compared at 426 to a predefined number, which represents the maximum number of high priority sets in a given flow. The network device may determine whether the set counter meets or exceeds the predefined number at 428. If the set counter does not meet or exceed the predefined number, the process may continue for further packets in the flow. More particularly, if the flow includes further packets at 430, a new set of packets may be initiated at 432 and the set counter may be incremented. If the flow does not include further packets, the process may end at 434. If the set counter meets or exceeds the predefined number, the packet priority may be set to low and any remaining packets in the flow may be treated as having a low priority at 436. In this instance, any further sets of packets in the flow need not be delineated or counted.

As described above, sets of packets may be delineated by a time delay that is greater than or equal to a pre-defined time delay. In this manner, flowlets of a flow may be identified and prioritized, as disclosed herein.

A very long-lived flow, such as that used by the Network File System (NFS) protocol, may carry multiple messages. In some embodiments, dynamic flowlet prioritization may be performed for each of the messages such that a particular number of initial sets of packets in each of the messages is prioritized. Each of the messages in the long-lived flow may be identified by detecting much larger gaps between packets.

In some embodiments, a second pre-defined time delay that is greater than the pre-defined time delay may be defined. For example, the second pre-defined time delay may be on the order of 10s to 100s of milliseconds. Where the time delay between two sets of packets is greater than or equal to the second pre-defined time delay, the second set of packets may be treated as the first set of packets in a new flow. Through the application of the second pre-defined time delay, it is possible to treat each of the messages in a very long flow as a separate flow.

The methods described herein may be repeated for further flows. The disclosed embodiments may be applied to flows consistently on a per-set basis. For example, the disclosed embodiments may be applied either on a per-packet basis or per-flowlet (e.g., per-burst) basis. Similarly, the pre-defined time delay used to delineate flowlets (e.g., bursts of packets) may be applied to flows consistently.

In some embodiments, the pre-defined number specifies a number of initial sets of packets to be prioritized for a given flow regardless of the characteristics of the flow, such as the length of the flow or the type of traffic of the flow. Thus, the pre-defined number may be applied to each flow regardless of a type of traffic being transmitted in the corresponding flow.

In some other embodiments, the pre-defined number of sets of packets to be prioritized may depend, at least in part, upon the characteristic(s) of the flow, such as the type of traffic being carried in the flow. Example types of traffic include control traffic, data traffic, voice over IP, video, gaming, etc. Other example types of traffic include high priority traffic, low priority traffic, and best effort. More particularly, the pre-defined number may be one of two or more pre-defined numbers, where each of the two or more pre-defined numbers is associated with a corresponding set of one or more flow characteristics such as particular traffic types. For example, the pre-defined number may be 100 for higher priority traffic such as control traffic, while the pre-defined number may be 10 for lower priority traffic such as games. As a result, the pre-defined number may be associated with one or more particular traffic type(s) (e.g. voice, video traffic), enabling the pre-defined number of initial sets of packets of a flow carrying one of the particular traffic type(s) to be prioritized. Accordingly, the pre-defined number of sets of packets to be prioritized for flows may be identical, or may vary with the traffic types being transmitted, as described herein.

A network device operating as described herein may be statically or dynamically configured with a single pre-defined number indicating the number of sets of packets to be prioritized for flows. Alternatively, the network device may be statically or dynamically configured with two or more pre-defined numbers such that each of the two or more pre-defined numbers is associated with a corresponding set of one or more flow characteristics (e.g., traffic types).

In some implementations, two or more types of traffic may correspond to two or more queues of packets such that each of the queues of packets is associated with at least one of the types of traffic. The prioritization mechanisms described herein may be applied to all traffic flows or types of traffic (or queues), or to a subset of traffic flows or types of traffic (or queues). For example, it may be undesirable to apply the prioritization mechanisms described herein to a particular traffic type or queue to which an absolute priority has been assigned, since the order of the corresponding packets is guaranteed.

Packet Forwarding

The prioritization of sets of packets for a given flow may include servicing or otherwise processing the sets of packets according to the priorities that have been assigned. Such processing may include processing data transmitted in the prioritized sets of packets. Alternatively, such processing may include forwarding each of the prioritized sets of packets. This processing may be performed by a network device such as that described herein.

The sets of packets in a given flow that have been prioritized may have absolute priority over remaining sets of packets in the flow. For example, a high priority queue including the prioritized packets or information associated therewith may have absolute priority over a lower priority queue in order to guarantee that the packets in the flow are not re-ordered. However, by giving the high priority queue absolute priority, there is a possibility that long flows will suffer starvation.

Alternatively, rather than having absolute priority over the lower priority queue, the high priority queue may be serviced more frequently than the lower priority queue. For example, the high priority queue may be serviced 10 times more frequently than the lower priority queue, which may be represented as a 10:1 ratio. In such an implementation, the sets of packets in the lower priority queue to be serviced may be determined based, at least in part, upon a queuing latency associated with the high priority queue. For example, the queuing latency may be a maximum or average queuing latency. Where multiple high priority queues are implemented, sets of packets in the lower priority queue to be serviced may be determined based, at least in part, upon a total queuing latency equal to the sum of the queuing latencies experienced in all of the high priority queues.

Latency is a measure of time delay experienced in a system. Queue latency may refer to a time between adding a set of packets to a queue and servicing (e.g., forwarding) the set of packets.

In some embodiments, a time gap between the receipt of two sequential sets of packets in a first number of initial sets of packets in a flow may be ascertained. More particularly, the time gap may be ascertained by comparing a time stamp from a last packet of the first set of packets with a time stamp of a first packet of the second set of packets. Where the second set of the first number of initial sets of packets in the first flow is in a lower priority queue, the second set of packets may then be serviced (e.g., forwarded) according to the time gap. More particularly, it may be determined whether the time gap is greater than a total queuing latency associated with the high priority queue(s). The second set of the first number of initial sets of packets may be forwarded according to whether the time gap is greater than the total queuing latency associated with the high priority queue(s). If the gap between sets of packets is greater than the total queuing latency experienced by packets in the high priority queue(s), then packets in the set after that gap cannot be delivered to their destination before the last packet in the previous set that was placed in the high priority queue. This guarantees that all the packets of the flow are delivered to their destination in order.

The term path may refer to a transmission channel between two nodes of a network that a packet follows. More particularly, the path may include one or more intermediary network devices such as routers or switches that forward packets along the path. There may be any number of intermediary network devices in a particular path.

In order to minimize the likelihood of packet reordering, all packets within a particular flow may be forwarded by the network device along a single path. For example, the network device may apply a hash function to information defining the flow (e.g., source address and destination address) to pick a particular path. In other implementations, sets of packets in a flow may be transmitted via two or more paths. For example, the sets of packets in a flow may be transmitted via a low latency path and a high latency path.

Generally, the techniques for performing the disclosed embodiments may be implemented by a device such as a network device. In some embodiments, the network device is designed to handle network traffic. Such network devices typically have multiple network interfaces. Specific examples of such network devices include routers and switches.

The disclosed embodiments may be implemented in one or more network devices within a network. A few example network architectures will be described in further detail below.

Leaf-Spine Network Architecture Versus Access-Aggregation-Core Network Architecture In order to meet the demands of a worldwide user base, the modern datacenter may be composed of hundreds, thousands, or even tens of thousands of data servers. However, a large number of servers within a datacenter places a corresponding high demand on the datacenter's networking infrastructure. Network traffic taxing this infrastructure may represent communications between servers within the datacenter itself, or it may represent requests for information or services originating outside the datacenter, such as from client computers located throughout the worldwide internet (hereinafter just "internet"). With regards to the latter, the total number of servers in a datacenter is typically many times the total number of connections to the internet, and so the sharing of a limited number of internet connections between many servers is typically an important consideration.

"Access-Aggregation-Core" Network Architecture

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B.

Figure 5:
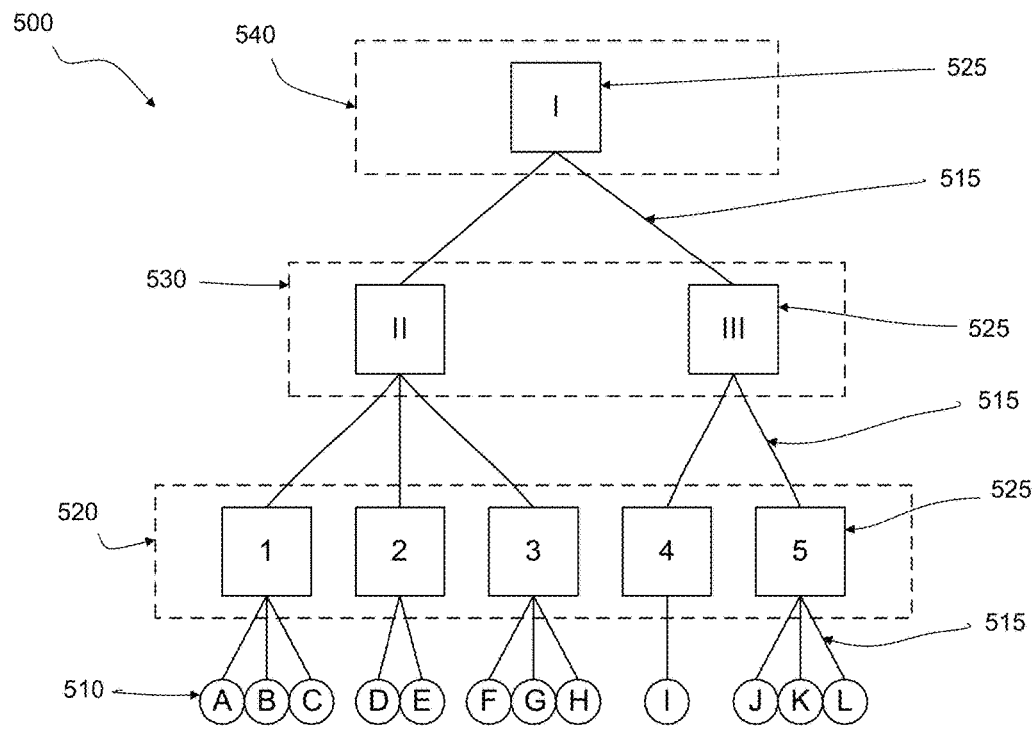
FIG. 5 is a diagrammatic representation of an example access-aggregation-core (AAC) network in which various embodiments may be implemented.

FIG. 5 schematically illustrates a simple network 500 made up of 12 "end devices" 510 (e.g., servers) which, following the "access-aggregation-core" (AAC) model, are connected through an access tier 520, an aggregation tier 530, and a top-level core tier 540. Within each tier are "network devices" 525 (e.g., ethernet switches) each of which controls flow of network traffic over various "links" 515 (e.g., ethernet cable) between it and the other network devices 525 and ultimately to and from end devices 510. As shown in FIG. 5, it is access tier 520 which provides each end device 510 with immediate access to the network. From there, traffic may pass to the aggregation tier 530, and then to the core tier 540, depending on its final destination. It is noted that for traffic whose final destination is within the network 500 shown in FIG. 5, how far up the hierarchy the traffic must be directed to reach this destination depends on the location of the destination within the network. Traffic whose final destination is outside the network shown in FIG. 5—e.g., to some server on the worldwide internet—will typically travel all the way up the hierarchy, since the connection or connections to the outside internet typically reside in the core tier. It is also noted that while FIG. 5 portrays each network device 525 identically for purposes of illustration, actual hardware implementations of such devices may possess substantial differences depending on whether the device is located in the access tier 520, the aggregation tier 530, or the core tier 540. For one thing, the single network device in the core tier 540 of FIG. 5 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 510 refers to a device connected to the network which is identified on the network and uses the network to communicate with other devices connected to the network. As such, the end device 510 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 510 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 5 illustrates the hierarchal connectivity of an access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 5, the end devices 510 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

Shared usage of links and network devices (such as just described) leads to bottlenecks in a network exhibiting a tree structure architecture like the access-aggregation-core (AAC) network shown in FIG. 5. For sake of simplicity, assume that in a given AAC network, data transmission over each link and through each network device is limited to the same maximum data transmission rate, and that each end device on this network can send and receive data at this maximum rate as well. In other words, the same bandwidth limitation applies to the whole network. If this is so, then referring again to FIG. 5, end devices A and B are able to communicate at full bandwidth, while end devices I and J are also communicating at full bandwidth. However, to use the previous example, if end device A attempts to communicate with end device K while end device I is communicating with end device J, then "blocking" occurs—e.g., either both pairs of end devices communicate at half maximum bandwidth, or they communicate at full bandwidth sequentially, one pair waiting for the other pair to finish. Obviously, the situation becomes much worse in a AAC network if many end devices which are topologically-separate from each other (i.e., their communication paths involve many links) attempt to simultaneously communicate with one another at full bandwidth.

Though the blocking problem is an inevitable consequence of the tree-structure paradigm, various solutions have been developed within this paradigm to lessen the impact of the problem. One technique is to build redundancy into the network by adding additional links between high traffic nodes in the network. In reference to FIG. 5, this might mean adding extra links between the core tier network device I, and the aggregation tier network devices II and III. Split-etherchannel and the like are examples implementing such an approach. Alternatively, instead of adding more links, standard-bandwidth links may be replaced by higher-bandwidth links, but the effect is essentially the same, albeit the consequences of link failure will be more severe versus having redundant links. With regards to link failure, it is noted in reference to FIG. 5 that even if redundant links are employed between the core and aggregation tiers, 1 link failure out of 4 in this simple example would reduce the network's bisectional bandwidth by a factor of 2. ("Bisectional bandwidth" is discussed in detail below.) Thus, it is evident that even with built-in redundancy, a tree-structured network architecture has inherent limitations, and, of course, there are costs associated with implementing hardware-based redundancy.

"Leaf-Spine" Network Architecture

Another way of addressing the ubiquitous "blocking" problem manifested in the modern datacenter's networking infrastructure is to design a new network around a topological paradigm where blocking does not present as much of an inherent problem. One such topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

Roughly speaking, leaf-spine networks lessen the blocking problem experienced by traditional networks by being less hierarchical and, moreover, by including considerable active path redundancy. In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form consists of two-tiers, a spine tier and leaf tier. Network devices within the leaf tier—i.e. "leaf network devices"—provide connections to all the end devices, and network devices within the spine tier—i.e., "spine network devices"—provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

Figure 6:
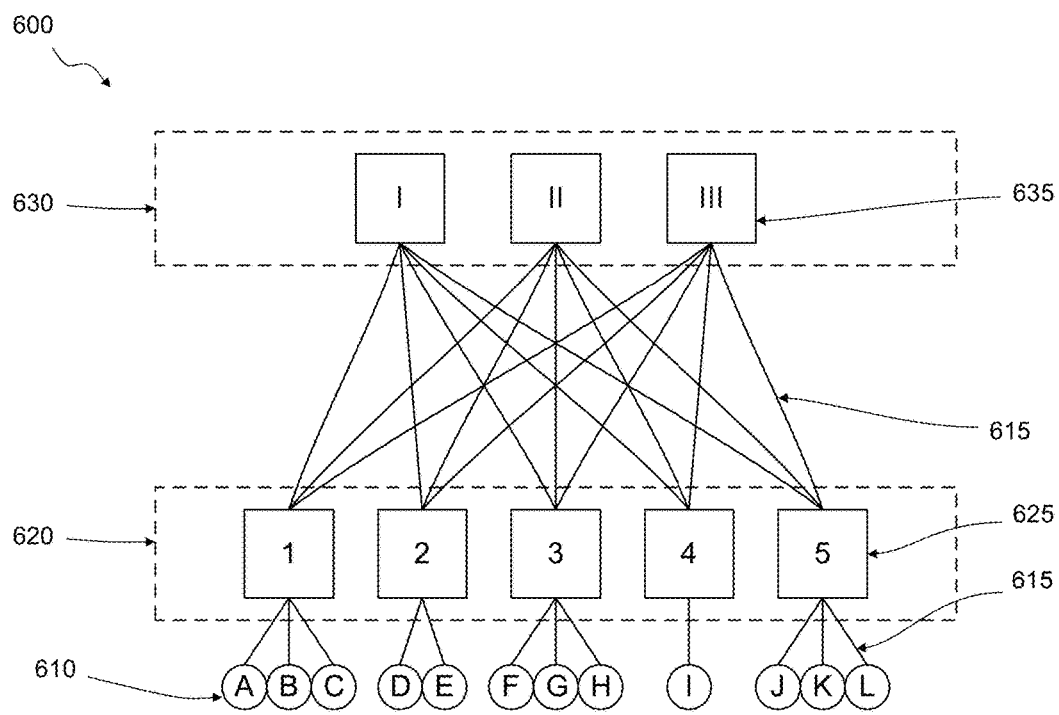
FIG. 6 is a diagrammatic representation of an example leaf-spine network in which various embodiments may be implemented.

FIG. 6 schematically illustrates a particular example of a basic leaf-spine network 600. To a certain extent, network 600 is analogous (or is the counterpart of) the AAC network 500 shown in FIG. 5. Both provide connectivity for 12 end devices which directly connect to 5 network devices in a first tier, in the case of network 600, to the 5 leaf network devices 625 of leaf tier 620, which are analogous to the 5 network devices 525 of the access tier 520 of the AAC network 500. However, moving on to the second tier, unlike the AAC network 500 which has a 2-network device aggregation tier 530 and a 1-network device core tier 540, the leaf-spine network 600 employs just a single additional tier, the spine tier 630, which consists of 3 spine-network devices 635.

Though in FIGS. 5 and 6 the total number of network devices in the higher tiers remains the same, the connectivity of these devices is quite different. FIG. 6 shows that in a prototypical leaf-spine network, every leaf network device 625 is connected to multiple spine network devices 635 creating the so-called "multi-rooted tree" topology—differing from the ordinary tree topology of an AAC network where each network device is connected to only one network device above it in the hierarchy. As a consequence and unlike an AAC network, in a leaf-spine network there are multiple paths of communication between any pair of leaf network devices 625, and thus also between any pair of end devices 610 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network 500. As shown in FIG. 6, in the leaf-spine network 600, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

As a second example, consider the scenario of simultaneous communication between end devices A and F and between end devices B and G which will clearly also lead to blocking in AAC network 500. In the leaf-spine network 600, although two leaf network devices 625 are shared between the four end devices 610, specifically network devices 1 and 3, there are still three paths of communication between these two devices (one through each of the three spine network devices I, II, and III) and therefore there are three paths collectively available to the two pairs of end devices. Thus, it is seen that this scenario is also non-blocking (unlike FIG. 5) because each pair of end devices still has access to 1.5 times the bandwidth required for max rate communication.

As a third example, consider the scenario of simultaneous communication between three pairs of end devices—between A and F, between B and G, and between C and H. In AAC network 500, this results in each pair of end devices having ⅓ the bandwidth required for full rate communication, but in leaf-spine network 600, once again, since 3 paths are available, each pair has exactly the bandwidth it needs for full rate communication. Thus, in a leaf-spine network having single links of equal bandwidth connecting devices, as long as the number of spine network devices 635 is equal to or greater than the number of end devices 610 which may be connected to any single leaf network device 625, then the network will have enough bandwidth for simultaneous full-rate communication between the end devices connected to the network.

More generally, the extent to which a given network is non-blocking may be characterized by the network's "bisectional bandwidth," which is determined by dividing a network that has N end devices attached to it into 2 equal sized groups of size N/2, and determining the total bandwidth available for communication between the two groups. If this is done for all possible divisions into groups of size N/2, the minimum bandwidth over all such divisions is the "bisectional bandwidth" of the network. Based on this definition, a network may then be said to have "full bisectional bandwidth" and have the property of being "fully non-blocking" if each leaf network device's total uplink bandwidth to the spine tier 630 (the sum of the bandwidths of all links connecting the leaf network device 625 to any spine network device 635) is at least equal to the maximum downlink bandwidth to end devices associated with any of the leaf network devices on the network.

To be precise, when a network is said to be "fully non-blocking" it means that no "admissible" set of simultaneous communications between end devices on the network will block—the admissibility constraint simply meaning that the non-blocking property only applies to sets of communications that do not direct more network traffic at a particular end device than that end device can accept as a consequence of its own bandwidth limitations. Whether a set of communications is "admissible" may therefore be characterized as a consequence of each end device's own bandwidth limitations (assumed here equal to the bandwidth limitation of each end device's link to the network), rather than arising from the topological properties of the network per se. Therefore, subject to the admissibility constraint, in a non-blocking leaf-spine network, all the end devices on the network may simultaneously communicate with each other without blocking, so long as each end device's own bandwidth limitations are not implicated.

The leaf-spine network 600 thus exhibits full bisectional bandwidth because each leaf network device has at least as much bandwidth to the spine tier (i.e., summing bandwidth over all links to spine network devices) as it does bandwidth to the end devices to which it is connected (i.e., summing bandwidth over all links to end devices). To illustrate the non-blocking property of network 600 with respect to admissible sets of communications, consider that if the 12 end devices in FIG. 6 are arbitrarily divided into 6 pairs, simultaneous communications between the 6 pairs are admissible, and thus may occur without blocking in network 600. In addition, it is noted that the non-blocking property of leaf-spine network 600 will be preserved if up to 15 end devices are connected, 3 to each of the 5 leaf network devices.

To implement leaf-spine network 600, the leaf tier 620 would typically be formed from 5 ethernet switches of 6 ports or more, and the spine tier 630 from 3 ethernet switches of 5 ports or more. The number of end devices which may be connected is then the number of leaf tier switches j multiplied by ½ the number of ports n on each leaf tier switch, or ½ ·j·n, which for the network of FIG. 6 is ½ ·5·6=15. Furthermore, the number of ports m on each spine tier switch is equal to the number of leaf tier switches j (so long as the maximum number of leaf tier switches are used), and so the total number of end devices is also given by ½ ·m·n, where m is the number of ports on the spine tier switches, and n is the number of ports on the leaf tier switches.

However, not every network is required to be non-blocking and, depending on the purpose for which a particular network is built and the network's anticipated loads, a fully non-blocking network may simply not be cost-effective. Nevertheless, leaf-spine networks still provide advantages over traditional networks, and they can be made more cost-effective, when appropriate, by reducing the number of devices used in the spine tier, or by reducing the link bandwidth between individual spine and leaf tier devices, or both. In some cases, the cost-savings associated with using fewer spine-network devices can be achieved without a corresponding reduction in bandwidth between the leaf and spine tiers by using a leaf-to-spine link speed which is greater than the link speed between the leaf tier and the end devices. If the leaf-to-spine link speed is chosen to be high enough, a leaf-spine network may still be made to be fully non-blocking—despite saving costs by using fewer spine network devices.

The extent to which a network having fewer spine tier devices is non-blocking is given by the smallest ratio of leaf-to-spine uplink bandwidth versus leaf-to-end-device downlink bandwidth assessed over all leaf network devices. By adjusting this ratio, an appropriate balance between cost and performance can be dialed in. In FIG. 6, for example, assuming links have equal bandwidth, one spine network device 635 could be eliminated if a blocking ratio of 3:2 was acceptable. This would imply that if 3 end devices connected to a single leaf network device attempt simultaneous communication to 3 or more end devices attached to other leaf networking devices, only ⅔ of the required bandwidth would be available. This is also referred to as "oversubscription." In this case, the "oversubscription rate" would be 1.5, since $1.5=(⅔)^{-1}$. Of course, as described above, increasing the leaf-spine uplink bandwidth between the remaining spine network devices and the leaf network devices could eliminate this oversubscription, albeit at a cost which may or may not be warranted depending on the network's anticipated loads.

This concept of oversubscription and building cost-effective networks having less than optimal bandwidth between spine and leaf network devices also illustrates the improved failure domain provided by leaf-spine networks versus their traditional counterparts. In a traditional AAC network, if a device in the aggregation tier fails, then every device below it in the network's hierarchy will become inaccessible until the device can be restored to operation (assuming no split etherchannel or equal cost multi-pathing (ECMP)). Furthermore, even if redundancy is built-in to that particular device, or if it is paired with a redundant device, or if it is a link to the device which has failed and there are redundant links in place, such a failure will still result in a 50% reduction in bandwidth, or a doubling of the oversubscription. In contrast, redundancy is intrinsically built into a leaf-spine network and such redundancy is much more extensive. Thus, as illustrated by the usefulness of purposefully assembling a leaf-spine network with fewer spine network devices than is optimal, absence or failure of a single device in the spine (or link to the spine) will only typically reduce bandwidth by 1/k where k is the total number of spine network devices.

It is also noted once more that in some networks having fewer than the optimal number of spine network devices (e.g., less than the number of end devices connecting to the leaf network devices), the oversubscription rate may still be reduced (or eliminated) by the use of higher bandwidth links between the leaf and spine network devices relative to those used to connect end devices to the leaf network devices.

Example "Leaf-Spine" Network Architecture

The following describes an example implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s—i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices ('downlink ports') and some fraction are used to connect to spine network devices ('uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports. In the particular embodiment described above, the bandwidth of the uplink ports is 4 times the bandwidth of the downlink ports—e.g., downlink port data transmission speeds are 10 GB/s and uplink port data transmission speeds are 40 GB/s. Depending on the embodiment, the downlink data transmission speed may be selected to be 10 MB/s (megabit/second), 100 MB/s, 1 GB/s (gigabit/second), 10 GB/s, 40 GB/s, 100 GB/s, 1 TB/s (terabit/second), and the corresponding uplink port data transmission speed may be chosen according to the foregoing proportions (of uplink to downlink port transmission speeds) Likewise, depending on the embodiment, the downlink data transmission speed may be selected from within a range of between about 10 MB/s and 1 TB/s, or between about 1 GB/s and 100 GB/s, or between about 10 GB/s and 40 GB/s, and the corresponding uplink port data transmission speed may also be chosen according to the previously described proportions (of uplink to downlink port transmission speeds).

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 48 to 150 ports, or more specifically from 48 to 100 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000 GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

Leaf-Spine Network Architectures Formed from More than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

One simple example of a 3-tier leaf-spine network may be built from just 4-port switches and this is schematically illustrated in FIGS. 7A-1, 7A-2, and 7B, in order to convey the general principle. Of course, it is to be understood that to build a large 3-tier network, larger switches would be employed. FIG. 7A-1 shows 4 4-port switches 722 (labeled "1-1," "1-2," "1-3," "1-4") connected to form a 2-tier leaf-spine network 701 for connecting 4 end devices 710 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 710, connected through 2 spine-network devices and 4 leaf network devices, but here, half the ports on the switches serving as spine network devices, switches 1-3 and 1-4, have their links pointed upward in FIG. 7A-1 to schematically indicate these links are reserved for uplink connection to a third tier. With the 4 4-port switches 722 connected in this manner, they may collectively be viewed as functioning as an 8 port switch 725, as schematically illustrated in FIG. 7A-2 (and labeled "1"), with 4 downlinks 705 to potential end devices 710 and 4 uplinks 715 to a potential third tier. Such an effective 8-port switch may then serve as a building-block for a 3-tier leaf-spine network.

FIG. 7B then shows how a 3-tier leaf-spine network 702 may be assembled from these 8-port building blocks. As shown in the figure, 4 8-port building blocks 725 may effectively serve as 4 leaf-network devices (labeled "1," "2," "3," "4,") in the leaf tier 720 of network 702. The spine tier 730 of network 702 is formed from 4 additional 4-port switches 735 (labeled "I," "II," "III," "IV"), similar to those used to form each 8-port leaf network device 725. Thus, when viewed in terms of 4-port switches, network 702 consists of 3 tiers with 8 4-port switches in the bottom tier, 8 4-port switches in the middle tier, and 4 4-port switches in the top tier, though this network may still be viewed as having a leaf tier 720 and spine tier 730, as just described. It is seen in the figure, that network 702 may connect up to 16 end devices 710. Generalizing this, it is noted that a 3-tier leaf-spine network may connect a total number of end devices equal to $\frac{1}{4} \cdot l \cdot m \cdot n$, where l, m, and n are the number of ports in the devices forming the top, middle, and bottom tiers, respectively (e.g., in FIG. 7B, $\frac{1}{4} \cdot 4 \cdot 4 \cdot 4=16$). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

The disclosed embodiments may be implemented in one or more network devices within a network such as that described herein. Within a leaf-spine network, the disclosed embodiments may be implemented in one or more leaf network devices and/or one or more spine network devices within one or more spine tiers.

Figure 8:
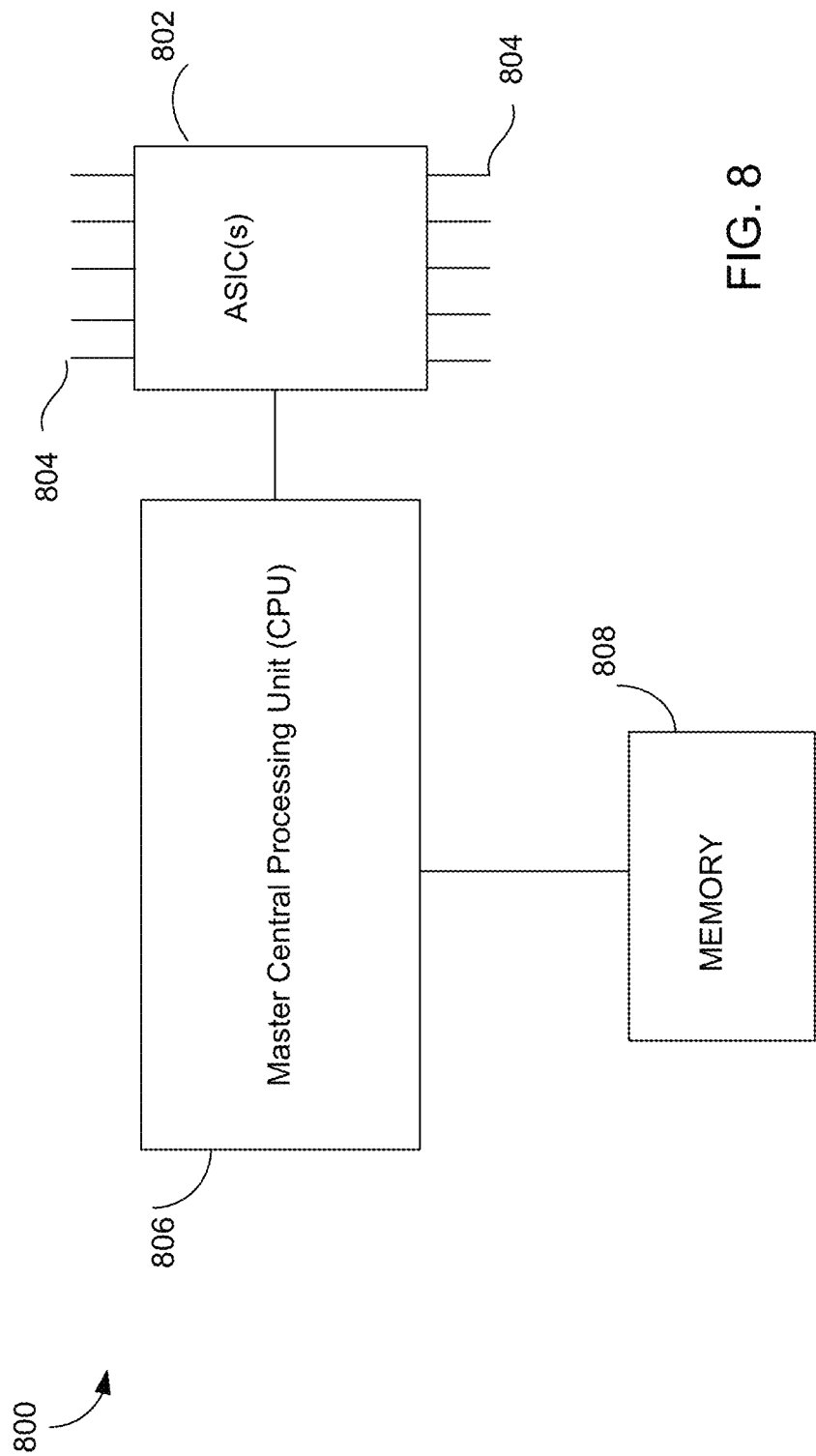
FIG. 8 is a diagrammatic representation of an example network device in which various embodiments may be implemented.

FIG. 8 illustrates an example of a network device that may be configured to implement various embodiments. Network device 800 may include one or more Application Specific Integrated Circuits (ASICs) 802. The ASICs 802 may have interfaces 804, which may include ports appropriate for communication with the appropriate media and protocols. The ASICs 802 may perform at least some of the functions of the logic described herein. In addition, a master central processing unit (CPU) 806 may perform other functions such as routing computations, network diagnostics, security functions, etc.

The interfaces 804 are typically provided as interface cards (not shown to simplify illustration), which may be referred to as "line cards". Generally, the interfaces 804 control the sending and receiving of packets over the network and may also support other peripherals used with the network device 800. The communication path between interfaces/line cards may be bus based or switch fabric based (such as a cross-bar). Among the interfaces that may be provided are Fibre Channel ("FC") interfaces, Ethernet interfaces, frame relay interfaces, cable interfaces, Digital Subscriber Line (DSL) interfaces, token ring interfaces, and the like. In addition, various very high-speed interfaces may be provided, such as fast Ethernet interfaces, Gigabit Ethernet interfaces, Asynchronous Transfer Mode (ATM) interfaces, High-Speed Serial Interfaces (HSSI), Packet over Sonet (POS) interfaces, Fiber Distributed Data Interfaces (FDDI), Asynchronous Serial Interfaces (ASI)s, DigiCable Headend Expansion Interfaces (DHEI), and the like.

When acting under the control of the ASICs 802, in some implementations of the invention the CPU 806 may be responsible for implementing specific functions associated with the functions of a desired network device. According to some embodiments, CPU 806 accomplishes all these functions under the control of software including an operating system and any appropriate applications software.

The CPU 806 may include one or more processors or specially designed hardware for controlling the operations of the network device 800. The CPU 806 may also include memory such as non-volatile RAM and/or ROM, which may be used for a variety of purposes such as, for example, caching and/or storing data, programming instructions, etc. However, there are many different ways in which memory could be coupled to the system.

Regardless of the network device's configuration, it may employ one or more memories or memory modules (such as, for example, memory block 806) configured to store data, program instructions for the general-purpose network operations and/or other information relating to the functionality of the techniques described herein. For example, the memory block 806 may correspond to a random access memory (RAM). The program instructions may control the operation of an operating system and/or one or more applications, for example. Because such information and program instructions may be employed to implement the systems/methods described herein, the disclosed embodiments relate to machine-readable media that include program instructions, state information, etc. for performing various operations described herein. Examples of machine-readable media include, but are not limited to, magnetic media such as hard disks and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the network device shown in FIG. 8 illustrates one specific network device, it is by no means the only network device architecture on which the disclosed embodiments can be implemented. For example, although a single ASIC is shown in FIG. 8, an architecture having two or more ASICs may also be implemented.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   determining from a packet that a new packet flow is to be created;
   initiating a new packet flow by adding the packet to a first new set of packets as a current set of packets;
   setting, in response to the initiating, a counter to an initial state;
   monitoring packets of the new packet flow until it determines that the current set of packets is complete, and during such monitoring processing the current set of packets as having a high priority;
   first setting, in response to the counter reaching a predetermined number, remaining packets in the new packet flow to low priority;
   in response to the counter not having reached a predetermined number and the new packet flow includes further packets to send:
     incrementing the counter;
     initiating another new set of packets of the new packet flow as a current set of packets; and
     returning, in response to the incrementing, to the monitoring.

2. The method of claim 1, wherein processing the current set of packets as having a high priority comprises adding the current set of packets to a high priority queue.

3. The method of claim 2, wherein setting remaining packets in the new packet flow to low priority comprises adding the current set of packets to a low priority queue.

4. The method of claim 3, wherein the high priority queue has absolute priority over the lower priority queue.

5. The method of claim 3, wherein the high priority queue is serviced more frequently than the lower priority queue.

6. The method of claim 1, wherein setting remaining packets in the new packet flow to low priority comprises adding the current set of packets to a low priority queue.

7. The method of claim 1, wherein the predetermined number is based on a type of traffic of the packet.

8. A non-transitory media storing instructions which when executed by a processor cause the processor to perform operations comprising:
   determining from a packet that a new packet flow is to be created;
   initiating a new packet flow by adding the packet to a first new set of packets as a current set of packets;
   setting, in response to the initiating, a counter to an initial state;
   monitoring packets of the new packet flow until it determines that the current set of packets is complete, and during such monitoring processing the current set of packets as having a high priority;
   first setting, in response to the counter reaching a predetermined number, remaining packets in the new packet flow to low priority;
   in response to the counter not having reached a predetermined number and the new packet flow includes further packets to send:
     incrementing the counter;
     initiating another new set of packets of the new packet flow as a current set of packets; and
     returning, in response to the incrementing, to the monitoring.

9. The media of claim 8, wherein processing the current set of packets as having a high priority comprises adding the current set of packets to a high priority queue.

10. The media of claim 9, wherein setting remaining packets in the new packet flow to low priority comprises adding the current set of packets to a low priority queue.

11. The media of claim 10, wherein the high priority queue has absolute priority over the lower priority queue.

12. The media of claim 10, wherein the high priority queue is serviced more frequently than the lower priority queue.

13. The media of claim 8, wherein setting remaining packets in the new packet flow to low priority comprises adding the current set of packets to a low priority queue.

14. The media of claim 8, wherein the predetermined number is based on a type of traffic of the packet.

15. A system comprising:
   a processor;
   a memory storing instructions that when executed by the processor cause the system to perform operations comprising:
     determining from a packet that a new packet flow is to be created;
     initiating a new packet flow by adding the packet to a first new set of packets as a current set of packets;
     setting, in response to the initiating, a counter to an initial state;
     monitoring packets of the new packet flow until it determines that the current set of packets is complete, and during such monitoring processing the current set of packets as having a high priority;
     first setting, in response to the counter reaching a predetermined number, remaining packets in the new packet flow to low priority;
     in response to the counter not having reached a predetermined number and the new packet flow includes further packets to send:
       incrementing the counter;
       initiating another new set of packets of the new packet flow as a current set of packets; and
       returning, in response to the incrementing, to the monitoring.

16. The system of claim 15, wherein processing the current set of packets as having a high priority comprises adding the current set of packets to a high priority queue.

17. The system of claim 16, wherein setting remaining packets in the new packet flow to low priority comprises adding the current set of packets to a low priority queue.

18. The system of claim 17, wherein the high priority queue has absolute priority over the lower priority queue.

19. The system of claim 17, wherein the high priority queue is serviced more frequently than the lower priority queue.

20. The system of claim 15, wherein setting remaining packets in the new packet flow to low priority comprises adding the current set of packets to a low priority queue.

* * * * *